Patented Apr. 9, 1929.

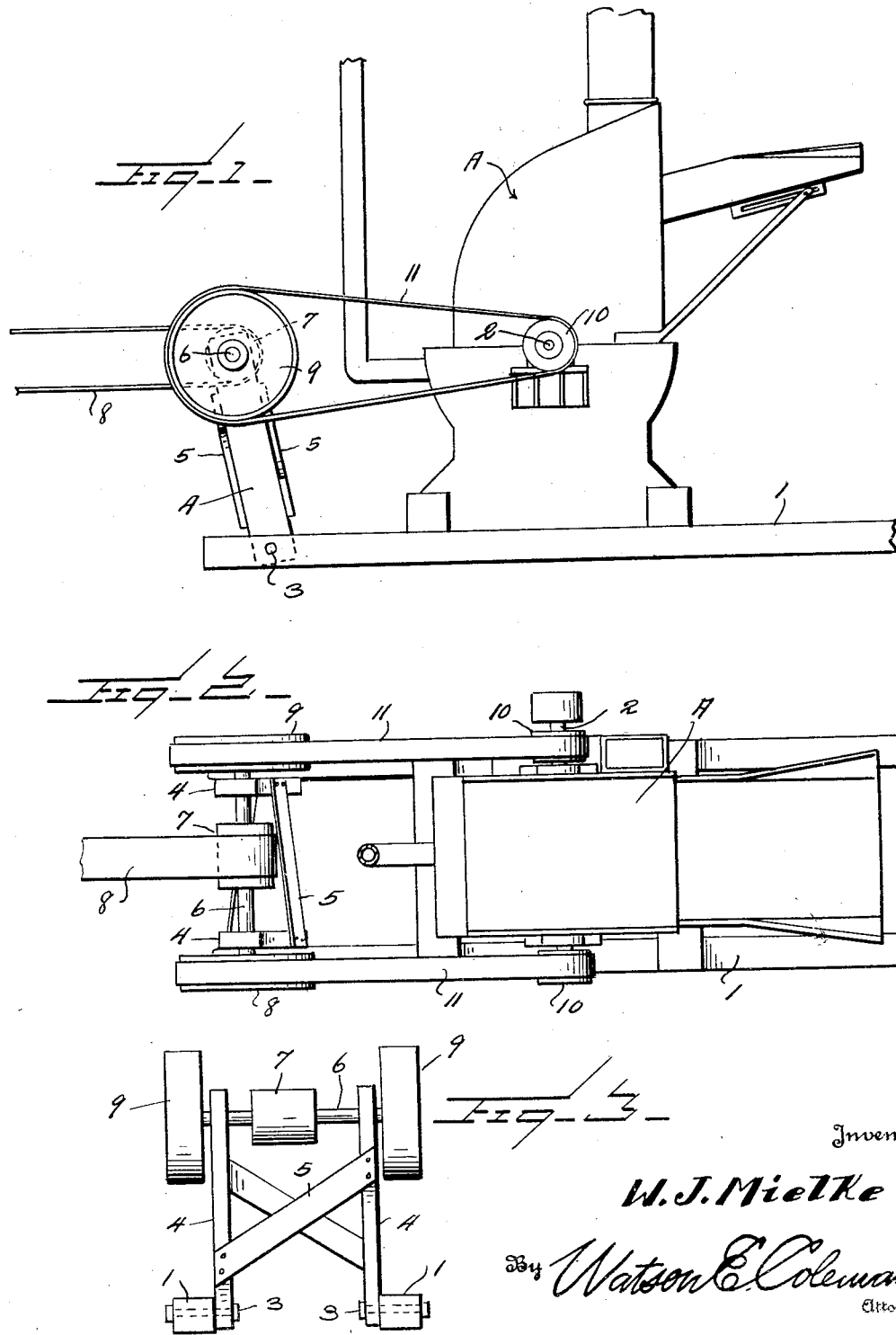

1,708,230

UNITED STATES PATENT OFFICE.

WILLIAM J. MIELKE, OF NEW HAMPTON, IOWA.

POWER-TRANSMITTING DEVICE.

Application filed February 4, 1928. Serial No. 251,969.

This invention relates to a power transmitting device and it is an object of the invention to provide means embodying a jack shaft adapted to be operatively engaged with the opposite end portion of a drive shaft and in a manner whereby a straight pull is imposed centrally of such connections with the drive shaft and thereby strain on the bearings of the drive shaft is eliminated.

It is also an object of the invention to provide a device of this kind wherein the jack shaft is mounted and driven in a manner whereby the belt connections between the jack shaft and the opposite end portion of the drive shaft are maintained as tight as the drive belt for the jack shaft.

Another object of the invention is to provide a power transmitting device whereby the desired change in the speed of the drive shaft will be readily accomplished by substituting pulleys of one size for pulleys of another.

The invention consists in the details of construction and in the combination and arrangement of the several parts of my improved power transmitting device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in side elevation of a power transmitting device constructed in accordance with an embodiment of my invention;

Figure 2 is a view in top plan of the structure as illustrated in Figure 1;

Figure 3 is a view in front elevation of the device as illustrated in Figure 1, the associated working unit being omitted.

As disclosed in the accompanying drawing, A denotes a hammermill of a well known type mounted upon the skids or sills 1 and which in its construction embodies a drive shaft 2 extending beyond opposite sides of the machine proper. While I herein particularly refer to a hammermill, it is to be understood that the same may comprise any other preferred machine or working unit.

Pivotally connected, as at 3, with the sills or skids 1 in advance of the machine A are the lower end portions of the upstanding rigid members or uprights 4 connected by the cross members 5 whereby said members or uprights 4 at all times are maintained in parallelism and have unitary swinging movement.

The upper portions of the members or uprights 4 rotatably support the jack shaft 6 and mounted upon this shaft 6 at a point midway of the members or uprights 4 is a pulley 7 adapted to be connected by the belt 8 or the like with a power pulley of a tractor or other suitable source of power.

The extremities of the shaft 6 have mounted thereon the relatively large pulleys 9 which align with the pulleys 10 fixed to the opposite end portions of the shaft 2 and the pulleys 9 are in driving connection with the pulleys 10 through the medium of the belts 11.

By having the members or uprights 4 pivotally connected with the sills or skids it will be noted that the tension of the belts at all times will be as tight as the tension of the belt 8 and that by having the jack shaft 6 in driving connection with the opposite end portions of the shaft 2, increased speed of the shaft 2 may be obtained due to the fact that the pulleys 9 are larger than the pulleys 10 and without undue strain on the bearings for the shaft 2.

It is to be stated that with my present arrangement no loss of power occurs as the belt 8 pulls straight on the shaft 6 at a point midway of the belts 11.

The desired speed of the shaft 2 may be varied or regulated as desired by substituting pulleys 9 of different sizes and also, if desired, by pulleys 10 of different sizes.

It is also to be noted that the arrangement which I employ permits the driving belt 8 to be engaged with a relatively large pulley 7 which assures an effective transmission of the desired power.

From the foregoing description it is thought to be obvious that a power transmitting device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a machine including a drive shaft, pulleys mounted on the opposite end portions of said drive shaft, uprights supported for swinging movement toward or from the machine, means for connecting the same for unitary swinging movement, a jack shaft rotatably supported by the uprights and substantially in parallelism with the shaft of the machine, pulleys carried by the opposite end portions of the jack shaft and in alignment with the pulleys of the shaft of the machine, belts operatively connecting the pulleys of the jack shaft and the shaft of the machine, and means for connecting the jack shaft midway of the pulleys thereon with a source of power.

In testimony whereof I hereunto affix my signature.

WILLIAM J. MIELKE.